T. O. CUTLER.
GRINDING MILL.
No. 10,476.
Patented Jan. 31, 1854.
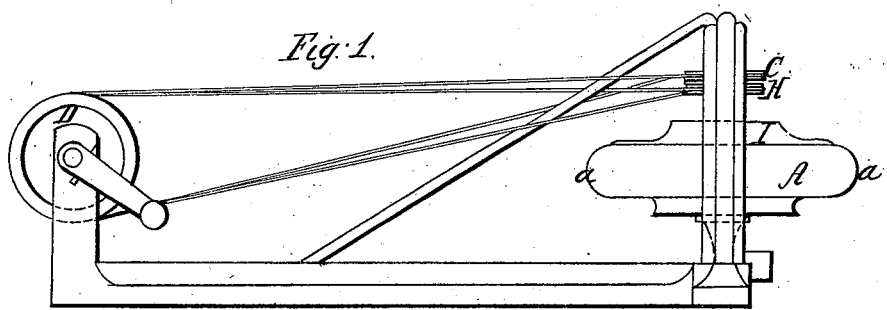
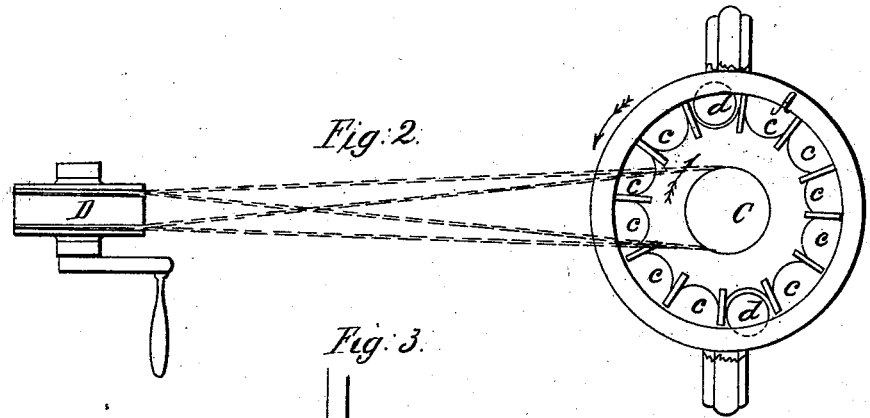
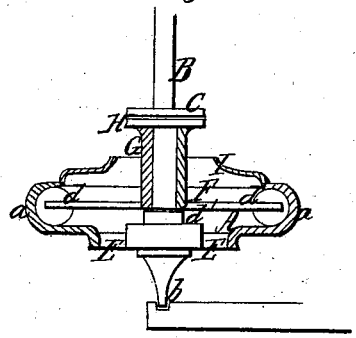

UNITED STATES PATENT OFFICE.

T. O. CUTLER, OF JERSEY CITY, NEW JERSEY.

QUARTZ-CRUSHER.

Specification of Letters Patent No. 10,476, dated January 31, 1854.

*To all whom it may concern:*

Be it known that I, T. O. CUTLER, of Jersey City, in the county of Hudson and State of New Jersey, have invented a new and Improved Mill for Grinding Quartz, Ores, Medicines, &c.; and I do hereby declare that the following is a full, clear, and exact description of the construction and operation of the same, reference being had to the annexed drawings, making a part of this specification, in which—

Figure 1, is a side view of the mill, in elevation. Fig. 2, is a top view or plan of the same. Fig. 3, is a vertical section of the basin, taken through the center. The hollow shaft of the disk is also bisected.

Similar letters of reference indicate corresponding parts in each of the several figures.

My invention consists in grinding, crushing or pulverizing quartz, ores and other substances by the centrifugal action of rotating or rolling balls that revolve about an axis when combined with, and acting against the inner periphery of a shell or concave which rotates on a common axis with the balls, which shell or concave contains the substance to be ground, &c., which by the centrifugal action due to the rotation of the shell or concave is properly distributed and held in the gutter like concavity of the shell to be acted upon by the balls in their passage.

To enable others skilled in the art to make and use my invention, I will proceed to describe its construction and operation.

A, represents a basin, having a curved side or rim, (*a*), and attached to a shaft, B, which passes through the center of the basin; said shaft being stepped at, (*b*), see Fig. 3, and having a suitable bearing at its upper end. On the upper part of the shaft, B, there is a pulley, C, around which a rope or belt passes; said belt also passing around a driving pulley or drum, D. Motion may be communicated to the basin in this or any other proper manner. At the center of the bottom of the basin, there is an opening or outlet, E, which may be formed of a series of small holes or apertures; or the outlet may be a single large opening, and covered with wire cloth; or it may consist of a series of slots; whichever way experience may dictate as being best.

F, is a circular disk, placed within the basin, A, and resting upon a projection or boss, (*d'*), on the shaft, B, see Fig. 3. The periphery of this disk has a series of semicircular recesses, (*c*), cut in it, in two of which are placed balls, (*d*), (*d*); two balls are represented, but any proper number may be used; if necessary, a ball may be placed in every recess. The balls, when fitted in the recesses, also fit in the curved rim or side, (*a*), of the basin, A; see Fig. 3. The balls do not fit tightly within the recesses in the periphery of the disk, but are allowed play sufficient to overcome the resistance offered by larger sized objects.

The disk, F, is provided with a hollow shaft, G, which encompasses the shaft, B; as seen in Fig. 3. The shaft, G, has a pulley, H, on its upper part, around which pulley a cross rope or belt passes; said rope or belt also passing around the driving pulley or drum, D, as seen in Figs. 1 and 2.

As the rope or belt of the basin is straight, and the rope or belt of the disk crosses, and both belts pass around the same drum or pulley, D, it follows, of course, that the basin and disk will have reverse motions, as indicated by the arrows in Fig. 2.

I do not confine myself to any particular mode of communicating motion to the basin and disk, as there are various ways of doing this. Gearing, in certain cases, would probably be preferable to belts.

I, is a hopper, attached to the upper part of the basin; as seen in Figs. 1, and 3.

Operation: This will be readily seen. The article to be ground is fed into the basin, A, through the hopper, I; motion having been previously communicated to the disk and basin. The article to be ground, of course, falls upon the disk, F, which, by its rotation, throws said article directly into the path of the balls, (*d*), (*d*), or into the concave of the rim, (*a*). The basin, by its rotation, keeps the article in the concave; and as the disk, F, and consequently the balls, (*d*), (*d*), rotate in a different direction to the basin, A, it will be seen that the balls must pass rapidly over or against the article, and grind or crush it, in an expeditious and perfect manner. In case any particles not sufficiently ground should be thrown out of the concave or path of the balls, they would touch upon the disk, F, and be thrown immediately back into the concave, as particles imperfectly ground possess sufficient weight to be under the influence of centrifugal force generated by the rotation of the basin and disk.

The disk, F, merely gives motion to the balls, which, by centrifugal force, bind or press against the curved rim or side, (a), of the basin, with a power proportionate to their weight and velocity. The article to be ground, as fast as it is reduced to a powder by the balls, is carried through the opening or outlet, E, at the center of the bottom of the basin, by means of a small stream of water or current of air introduced into the hopper, I, and passing through the outlet, E; said stream of water or current of air being sufficiently great to carry with it the powder, but not sufficiently strong to carry through coarse particles or those not sufficiently ground. The discharge may be at any point from the grinding surface to the center.

I do not confine myself to the exact form of the disk, F, as herein shown; for arms may be employed to give motion to the balls, if desired. The disk, however, is preferable.

I am aware that substances have been ground, &c., by means of balls acting in a basin or cylinder, but in such cases the balls have been made to act by gravity, but I am not aware that in any machine known prior to my invention the material to be ground, &c., has been properly distributed and held against the inner periphery of a shell or concave extending around the path of the balls by centrifugal action imparted by the rotation of the shell itself, and acted upon by the centrifugal action of balls revolving about a common axis and rolling against the periphery of the said shell.

What I claim therefor as my invention and desire to secure by Letters Patent is—

The employment of balls to act by centrifugal action due to their rotation about a common center, substantially as specified, when the said balls are combined and act against the inner periphery of a shell or concave which rotates on a common axis with the balls and which by reason of its rotation distributes and holds the material to be ground, &c., in the concavity of the said shell, substantially as specified.

T. O. CUTLER.

Witnesses:
S. H. WALES,
L. F. COHEN.